United States Patent
Bruhn

(10) Patent No.: US 10,083,704 B2
(45) Date of Patent: Sep. 25, 2018

(54) HYBRID RTP PAYLOAD FORMAT

(71) Applicant: Telefonaktiebolaget LM Ericsson (publ), Stockholm (SE)

(72) Inventor: Stefan Bruhn, Sollentuna (SE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 205 days.

(21) Appl. No.: 15/039,678

(22) PCT Filed: Nov. 27, 2014

(86) PCT No.: PCT/SE2014/051412
§ 371 (c)(1),
(2) Date: May 26, 2016

(87) PCT Pub. No.: WO2015/080658
PCT Pub. Date: Jun. 4, 2015

(65) Prior Publication Data
US 2016/0379658 A1 Dec. 29, 2016

Related U.S. Application Data

(60) Provisional application No. 61/909,748, filed on Nov. 27, 2013.

(51) Int. Cl.
*G10L 19/16* (2013.01)
*H04L 29/06* (2006.01)

(52) U.S. Cl.
CPC ......... *G10L 19/167* (2013.01); *H04L 65/607* (2013.01); *H04L 65/608* (2013.01); *H04L 69/04* (2013.01); *H04L 69/22* (2013.01)

(58) Field of Classification Search
CPC ..... H04L 65/607; H04L 65/608; H04L 69/04; H04L 69/22; G10L 19/167; H04W 28/06; H04W 28/065
(Continued)

(56) References Cited

U.S. PATENT DOCUMENTS 6,233,253 B1 * 5/2001 Settle ................. H04N 21/4347
370/474
6,680,955 B1 * 1/2004 Le ........................... H04L 29/06
370/477
(Continued)

FOREIGN PATENT DOCUMENTS

EP 1338128 B1 6/2006
EP 1766919 B1 12/2012
(Continued)

OTHER PUBLICATIONS

Sjoberg, J, "RTP Payload Format and File Storage Format for the Adaptive Multi-Rate (AMR) and Adaptive Multi-Rate Wideband (AMR-WB) Audio Codecs," Network Working Group, Request for Comments: 4867, Obsoletes: 3267 Apr. 2007, 59 pages.

(Continued)

*Primary Examiner* — Maharishi V Khirodhar
*Assistant Examiner* — Kenneth P Hunt
(74) *Attorney, Agent, or Firm* — Rothwell, Figg, Ernst & Manbeck P.C.

(57) ABSTRACT

In accordance with an example embodiment of the present invention, disclosed is a method and an apparatus thereof for formatting a payload for transmission of multi-mode speech/audio codec data. The method comprises deciding whether a header-less or a header-full payload format is used for transmission of a coded frame. The decision is based on a codec mode and a required functionality. The payload data is packetized with or without the payload header depending on the decision.

28 Claims, 5 Drawing Sheets

(58) Field of Classification Search
USPC .......................................................... 370/476
See application file for complete search history.

(56) References Cited

U.S. PATENT DOCUMENTS

| | | | | |
|---|---|---|---|---|
| 7,688,745 | B1* | 3/2010 | Hurtta | H04W 28/18 370/252 |
| 2002/0064164 | A1* | 5/2002 | Barany | H04L 29/06 370/401 |
| 2002/0097701 | A1* | 7/2002 | Lupien | H04W 28/06 370/338 |
| 2004/0047437 | A1* | 3/2004 | Hamiti | H04W 28/18 375/326 |
| 2005/0015514 | A1* | 1/2005 | Garakani | H03M 7/46 709/247 |
| 2005/0261899 | A1* | 11/2005 | Brueck | H04W 88/181 704/221 |
| 2006/0034260 | A1* | 2/2006 | Svedberg | H04W 4/10 370/352 |
| 2006/0262788 | A1 | 11/2006 | Johnson et al. | |
| 2007/0086434 | A1 | 4/2007 | Venkatachalam et al. | |
| 2008/0123660 | A1 | 5/2008 | Sammour et al. | |
| 2009/0116458 | A1 | 5/2009 | Ramesh et al. | |
| 2009/0147787 | A1 | 6/2009 | Arulambalam et al. | |
| 2012/0035918 | A1 | 2/2012 | Frankkila et al. | |

FOREIGN PATENT DOCUMENTS

| | | |
|---|---|---|
| RU | 2128886 C1 | 4/1999 |
| RU | 2321961 C2 | 4/2008 |
| RU | 2475989 C2 | 2/2013 |

OTHER PUBLICATIONS

International Preliminary Report on Patentability (Chapter II) issued by the ISA in PCT/SE2014/051412, dated Mar. 7, 2016, 27 pages.
International Search Report and Written Opinion of the ISA in PCT/SE2014/051412, dated Mar. 6, 2015, 9 pages.
Translation of Russian Search Report issued in Application No. 2016125218/08(039508) dated Jul. 20, 2017, 2 pages.
Li, A., "RTP Payload Format for Enhanced Variable Rate Codecs (EVRC) and Selectable Mode Vocoder (SMV)", Network Working Group, Request for Comments (RFC) 3558, Category: Standard Track, Jul. 2003, 23 pages.

* cited by examiner

HYBRID RTP PAYLOAD FORMAT

CROSS REFERENCE TO RELATED APPLICATION(S)

This application is a 35 U.S.C. § 371 National Phase Entry Application from PCT/SE2014/051412, filed Nov. 27, 2014, which claims priority to U.S. Application No. 61/909,748, filed Nov. 27, 2013. The above identified applications are incorporated by reference.

TECHNICAL FIELD

The present application relates generally to a speech/audio coding, and in particular to a method and apparatus for formatting a payload for transmission of multi-mode speech/audio codec data.

BACKGROUND

3rd Generation Partnership Project 3GPP specifies Adaptive Multi-Rate (AMR) and Adaptive Multi-Rate Wideband (AMR-WB) as mandatory speech codecs for voice services in 3G networks. These codecs are also mandatory for 3GPP Voice over IP (VoIP) service that is specified within the 3GPP multimedia telephony via IP Multimedia Subsystem (IMS). The ruling specification for the media handling and interaction is 3GPP TS 26.114. Despite the mandatory status of these codecs there are presently activities in 3GPP to specify a new voice codec that will enable even higher service quality than what is possible with AMR-WB, the Enhanced Voice Service (EVS) codec.

However, introducing a new speech codec into a speech communications system may be problematic in some respects. One problem is that there is always an installed base of legacy equipment (both terminals and network infrastructure) that does only support the existing 3GPP codecs or just one of them, for instance AMR-WB, rather than the new codec. This may lead to interoperability problems in which communication between new and legacy equipment is not possible unless proper mechanisms are implemented in the system. Traditional ways to address this problem is the provisioning of transcoders in e.g. media gateways that translate between the new and the old coding formats, or the provisioning of the legacy codecs besides the new codec in new terminals that allows choosing the legacy coding format when a connection to a legacy terminal is established. This latter method requires that there is a capability exchange between the terminals prior to the actual speech connection that identifies the common codec that both terminals support. Within the IMS the session description protocol (SDP) IETF RFC 4566 is used to carry out this capability exchange.

The above described ways for ensuring interoperability when introducing a new codec into a communication system are though not the only possibilities and have various disadvantages. The provisioning of transcoders means additional equipment that raises the network investment and maintenance costs. Transcoding is also associated with undesirable speech quality degradations. Using the capability exchange between the terminals prior to the call is a very elegant way, which however may not always be possible. Examples where this is not always possible are multi-party conferencing, hand-over scenarios with mobile users roaming to cells without Multimedia Telephony Service for IMS (MTSI) support, voice messaging. Also from terminal implementation point of view it may be undesirable to provide support for the complete set of new and legacy codecs as this may increase implementation and technology licensing costs.

Consequently, there is a need for enabling introducing new speech codecs into telecommunication systems to provide an improved quality of service, in particular to 3GPP systems, whilst maintaining backwards compatibility with old or legacy codecs.

A third possibility hence chosen by 3GPP for the EVS codec to interoperate with legacy AMR-WB equipment is the inclusion of AMR-WB interoperable coding modes as one part of the EVS codec besides completely new operation modes. This approach alleviates all above discussed problems. However, 3GPP does not specify solutions about how to signal from a sending side UE to a receiving side UE which of the available EVS modes, AMR-WB interoperable or non-interoperable has been used for coding and at what bit rate.

One possible solution of this signaling problem is disclosed in US20120035918: "Method and arrangement for providing a backwards compatible payload format". This solution relates to methods of introducing new speech codecs into legacy systems. In particular, this solution discloses a backwards compatible payload format which allows inclusion of a new speech codec. In a concrete application of this solution the AMR-WB interoperable modes of the EVS codec are Real-time Transport Protocol (RTP) packetized like AMR-WB packets according to IETF RFC 4867. A signaling bit is though included in the previously unused bits of the AMR-WB payload format, in order to provide the possibility to signal the possible use of the new non-interoperable EVS codec modes. If the corresponding bit in the RTP payload header is set, this is treated as a signal that the speech/audio payload data bits to follow represent a bit stream associated with the new non-interoperable EVS codec modes rather than the AMR-WB interoperable modes.

The problem with the above described approach of US20120035918 is however that a corresponding RTP payload format for the EVS codec inevitably makes use of the RTP payload header of the included legacy codec (AMR-WB). In applications where transmission resources are extremely limited such an overhead is undesirable.

In order to solve this overhead problem there exist other solutions that do not use an RTP payload header at all (example EVRC (Enhanced Variable Rate Codec) or ITU-T G.729 codec). The necessary signaling information related to the payload is in such cases derived from other information elements of the RTP packets, as e.g. information provided in the IP/UDP/RTP header fields that are different from an RTP payload header. One important information element that can be used is the size of the RTP payload or the size of the packet. If it is clear that each RTP packet always only contains a single frame of coded speech/audio (corresponding to e.g. 20 ms speech/audio), then the bit rate used for coding of the speech/audio signal is easily obtained from the RTP payload size. This is a practical solution in case the codec uses only a limited and discrete set of rates and if the operation modes of the codec are directly connected to the respective bit rates. In case, however, frame aggregation is used, meaning that a plurality of coded speech/audio frames are transmitted within a packet, this solution does not always work. This will be exemplified as follows: Assume up to 2 coded frames can be transmitted in each RTP packet and the codec has two codec modes with rates 8 kbps and 16 kbps. Each frame corresponds to 20 ms.

It is now further assumed that the sender operates with frame aggregation and that it places two frames into each packet. In the example it is further assumed that the first frame of the packet is encoded with 8 kbps, meaning that it comprises 20 bytes of data. The second frame is encoded with 16 kbps meaning that the coded speech frame comprises 40 bytes of data. The payload size of the packet containing both aggregated frames is hence 60 bytes. The receiver receives this RTP packet with 60 bytes payload and the task is to figure out in what way the data included in it is encoded. The receiver might now conclude from the reception of this packet and its payload size that it either contains 3 frames of data encoded at 8 kbps or one frame encoded at 16 kbps and one frame encoded at 8 kbps. In the latter case it is yet not clear whether the 8 kbps encoded frame comes first or second. As becomes clear from the example, this ambiguity makes it impossible for the decoder in the receiver to decode the received frames in a proper way. Hence, allowing frame aggregation (or not excluding the possibility of frame aggregation) may introduce ambiguities making header-less RTP payload formats impossible. Frame aggregation is though a very desirable feature for VoIP for certain IP networks with e.g. WLAN access.

Another problem pertains to the possible interoperation of the AMR-WB interoperable modes of the EVS codec with legacy equipment supporting AMR-WB codec only. For the purpose of mode adaptation the AMR-WB RTP payload format provides in its header a 4 bit wide bit field to carry so-called CMRs (codec mode requests). The purpose of the CMRs is to signal to a sending side UE the preferred codec mode it should use in its encoding operation. This allows adapting the used bit rate in response to e.g. transmission channel changes or system capacity limitations, the so-called AMR adaptation using inband signaling. A header-less payload format of the EVS codec for the AMR-WB interoperable modes would not be able to transport these CMRs and hence in interoperation scenarios with legacy AMR-WB equipment codec mode adaptation based on the AMR inband signaling concept using the CMRs would not be possible.

SUMMARY

The objective of the present embodiments is to solve or at least alleviate at least one of the above mentioned problems.

The objective is to provide an efficient RTP payload format for a multi-mode codec speech/audio comprising at least two operating modes out of which one can interoperate with a codec that is already deployed by an existing legacy. The problem on the one hand is to make the payload format as efficient as possible in a sense that it contains as little overhead as possible. At the same time there shall be no limitations with regards to possibilities to aggregate a multitude of coded frames in an RTP packet. Moreover, in cases when the legacy coding mode is used in an interoperation context with legacy equipment, the RTP payload format shall be capable of transmitting additional signaling information necessary for interoperation with the legacy equipment.

More specifically, the codec that is already deployed by existing legacy may be AMR-WB, and the signaling information related to interoperating with legacy equipment using AMR-WB may be AMR-WB mode adaptation data and even more specifically CMR information.

According to a first aspect of the invention, a method is provided for defining a payload format for speech/audio codec interoperability support, selecting the payload format and formatting a payload for transmission of multi-mode speech/audio codec data. The method comprises defining a set of codec modes and bits rates used for encoding a speech/audio payload. Based on the used codec mode and bit rate it is decided whether or not a payload header is used, and the payload data is packetized with or without the payload header depending on the decision.

According to a second aspect of the invention, a method is provided for depacketization of speech/audio data frames in a received packet. It may first be determined whether the payload size corresponds to any of the set of protected or unique payload sizes. In that case it is determined that header-less packetization was used and the size of the payload identifies in a unique manner the used codec mode and bit rate. Otherwise, it is determined that header-full packetization was used. In that case, payload header is read to determine information about the rate and codec mode used for encoding the speech/audio payload.

According to a third aspect of the invention, an apparatus is provided for packetizing speech/audio data. The apparatus comprises a decision unit for deciding whether or not a payload header is used, the decision being made based on the used codec mode and bit rate. The apparatus further comprises a packetizer for packetizing the speech/audio payload with or without the payload header depending on the decision of the decision unit.

According to a fourth aspect of the invention, an apparatus is provided for depacketizating speech/audio data frames in a received packet. A depacketizer may first determine whether the payload size corresponds to any of the members of the set of protected or unique payload sizes. In that case it is determined that header-less packetization was used and the size of the payload identifies in a unique manner the used codec mode and bit rate. Otherwise, it is determined that header-full packetization was used. In that case, the depacketizer reads the payload header, which contains all necessary signaling information about the rate and codec mode used for encoding the speech/audio payload.

According to a fifth aspect of the invention, a computer program is provided comprising computer readable code units which when run on an apparatus causes the apparatus to decide whether or not a payload header is used, the decision being made based on the used codec mode and bit rate, and to packetize the speech/audio payload with or without the payload header depending on the decision of the decision unit.

According to a sixth aspect of the invention, a computer program is provided comprising computer readable code units which when run on an apparatus causes the apparatus to determine whether the payload size corresponds to any of the members of the set of protected or unique payload sizes, and when it is determined that the payload size does not correspond to any of the members of the set of protected or unique payload sizes, the apparatus is further caused to read the payload header to determine information about the rate and codec mode used for encoding the speech/audio payload.

According to a seventh aspect, a computer program product comprises a computer readable medium storing a computer program according to the above-described fifth or sixth aspect.

DRAWINGS

For a more complete understanding of example embodiments of the present invention, reference is now made to the following descriptions taken in connection with the accompanying drawings in which:

FIG. 4 illustrates an example scheme of header-less RTP payload for AMR-WB mode 12.65.

FIG. 5 illustrates an alternative example scheme of header-less RTP payload for AMR-WB mode 12.65 with displacement.

DETAILED DESCRIPTION

The embodiments of the invention use a combination of a header-less and a header-full RTP payload format. In order to guarantee that the use of the efficient header-less format does not lead to RTP payload size ambiguities making proper decoding by the receiver impossible, the header-less format is only used conditionally in certain cases. Otherwise a header-full RTP payload format with payload header is used, where the payload header includes all relevant signaling information required for identifying the codec mode and bit rate used for encoding of the data included in the RTP payload. Part of the idea is to specify a set of unique RTP packet sizes that relate directly and in a unique fashion to the bit rate and coding mode used for encoding the speech/audio payload. In case the header-full payload format is used, when creating the RTP packet its size is controlled such that it does not coincide with any of the set of unique RTP packet sizes reserved for the header-less payload format. If this is the case, the RTP packet size is adjusted by adding padding bytes until the conflict with the reserved RTP packet sizes is resolved. Further, the data associated with the codec mode to be used for interoperating with legacy equipment is transmitted using the efficient header-less payload format. Additional signaling information necessary for interoperation with the legacy equipment is transmitted using spare bits in the payload either through spreading this information in time or through remapping it to the available spare bits.

Figure 1:
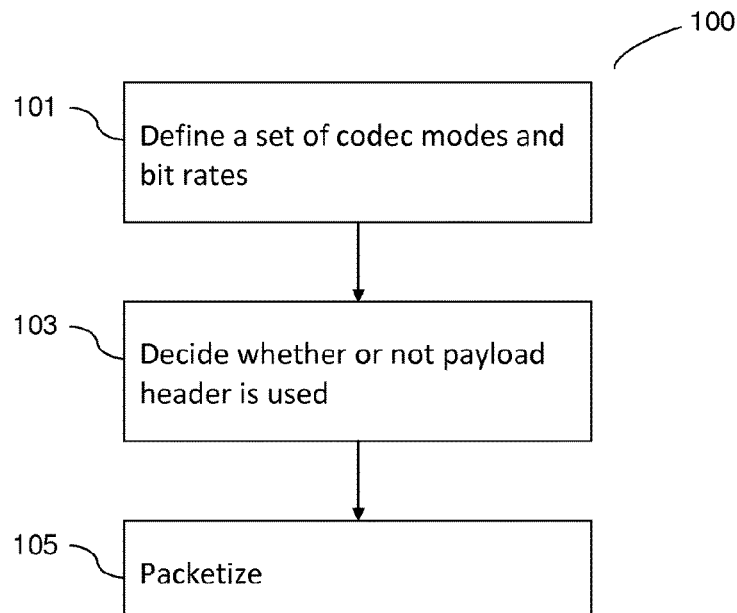
FIG. 1 illustrates an example of the method performed by an encoder.

One embodiment is described as the following method 100 illustrated in FIG. 1. In a first step 101 the set of codec modes and/or bit rates is defined for which the RTP payload shall allow efficient transmission without RTP payload header. This set corresponds then to the set of protected or unique payload sizes, called "prot_set".

As an example it is now assumed that the RTP payload format shall allow for transmission of legacy AMR-WB payload and payload not interoperable with AMR-WB. The set of AMR-WB rates belonging to the set is shown in following Table 1 and comprises all 9 AMR-WB modes and the SID (Silence Insertion Descriptor) mode used for Discontinuous transmission (DTX)/comfort noise operation:

TABLE 1

| AMR-WB interoperable modes/rates | | | |
|---|---|---|---|
| # | mode | Bits per frame | Bytes (octets) per frame |
| 0 | 6.6 | 132 | 17 |
| 1 | 8.85 | 177 | 23 |
| 2 | 12.65 | 253 | 32 |
| 3 | 14.25 | 285 | 36 |
| 4 | 15.85 | 317 | 40 |
| 5 | 18.25 | 365 | 46 |
| 6 | 19.85 | 397 | 50 |
| 7 | 23.05 | 461 | 58 |
| 8 | 23.85 | 477 | 60 |
| 9 | SID | 40 | 6 |

The set of non-interoperable (i.e., not interoperable with legacy AMR-WB codec) bit rates/modes that shall belong to the set of rates/modes that can be transmitted in the example without RTP payload header is shown in the following Table 2:

TABLE 2

| Non-interoperable modes for which header-less packetization is preferred | | | |
|---|---|---|---|
| # | mode | Bits per frame | Bytes (octets) per frame |
| 0 | 2 | 40 | 5 |
| 1 | 2.4 | 48 | 6 |
| 2 | 2.8 | 56 | 7 |
| 3 | 4 | 80 | 10 |
| 4 | 5.6 | 112 | 14 |
| 5 | 7.2 | 144 | 18 |
| 6 | 8 | 160 | 20 |
| 7 | 9.6 | 192 | 24 |
| 8 | 13.2 | 264 | 33 |
| 9 | 16.4 | 328 | 41 |
| 10 | 24.4 | 488 | 61 |

Hence, in the example the set of protected (unique) payload sizes is the following:

Prot_set={7, 10, 14, 17, 18, 20, 23, 24, 32, 33, 36, 40, 41, 46, 50, 58, 60, 61}.

The following additional set of bit rates belonging to the non-interoperable mode shall in the example not be transmitted without RTP payload header but rather with payload header, see the following Table 3:

TABLE 3

| Set of non-interoperable modes/rates for which header-full packetization is chosen | | | |
|---|---|---|---|
| # | Mode | Bits per frame | Bytes (octets) per frame |
| 11 | 32 | 640 | 80 |
| 12 | 48 | 960 | 120 |
| 13 | 64 | 1280 | 160 |
| 14 | 96 | 1920 | 240 |
| 15 | 128 | 2560 | 320 |

In a next step 103 the method decides whether the RTP packetization with or without RTP payload header is used. As an example, in case frame aggregation is used with more than one coded frame per packet, RTP packetization with header will be used. There is hence no risk that the aggregation of multiple frames within the RTP packet may lead to ambiguities making it hard or impossible for the receiver to decode the payload correctly. Furthermore, there may be more conditions for which the header-full rather than the header-less packetization is selected. For instance, this may depend on the bit rate of the transmitted codec mode. In particular, if the bit rate is large, the overhead associated with header-full packetization may be relatively small and hence acceptable. Another reason for choosing the header-full packetization may for instance be the need to transmit additional information in the RTP packet that should be placed in the payload header. As an example this could be information bits related to mode adaptation (like CMRs) or other codec specific signaling data (like audio bandwidth information or codec internal mode information) that need to be conveyed to the receiver in order to operate the decoder properly.

Figure 2:
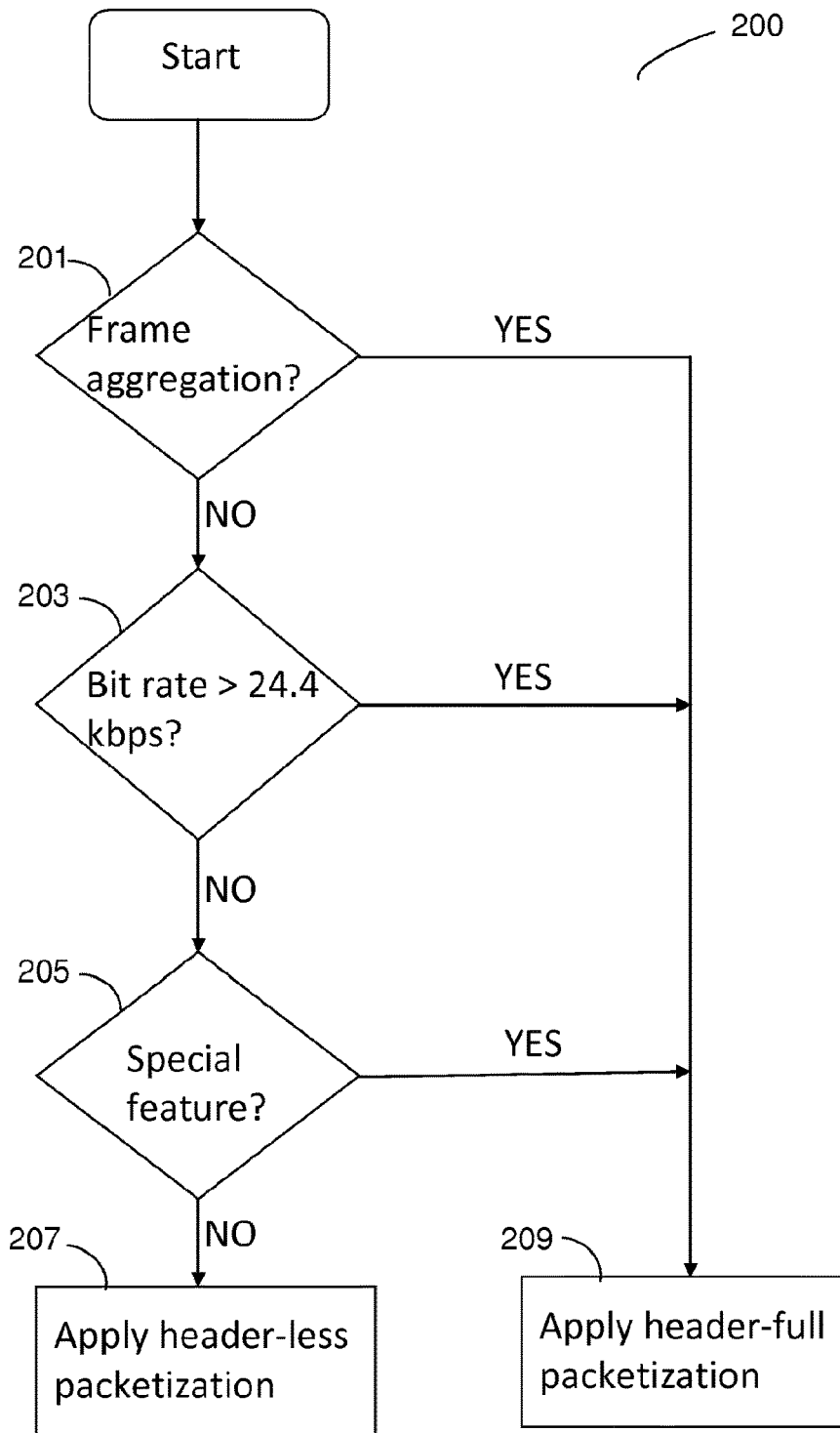
FIG. 2 is a flowchart of a decision algorithm to decide if header-less or header-full packetization is use.

As an example of this step the flowchart of FIG. 2 illustrates a decision algorithm 200 to decide whether header-less or header-full packetization is used. In this example header-full packetization is always chosen if frame aggregation with multiple frames per packets is used, selection at block 201, the bit rate exceeds 24.4 kbps, selection at block 203, or in case of a special feature requiring that, selection at block 205. Such a special feature can be, as explained above, the availability of mode adaptation data or other codec specific signaling data. Hence, in this example decision parameters whether to use the header-less packetization 207 or not 209 are:

Frame aggregation (num_agg)
bit rate, or number bytes (octets) per frame
Special feature requiring header-full payload format.

In a next step 105, as part of the packetization, the size of the RTP payload (or correspondingly of the RTP packet) is determined. This can be accomplished by the following algorithm in c-programming style pseudo code, based on the above determination of whether header-less or header-full packetization shall be used:

If header-less then
   Payload-size=octets(0)
else
   For Payload-size=0,i=0;i<num_agg;i++
      Payload-size+=octets (i)+1
   While Payload-size in prot_set
      Payload-size++

In the above pseudo-code 'octets' corresponds to the size in bytes of the coded speech/audio data of a given frame i (the counting starts from 0). 'num_agg' is the number of aggregated frames per packet, i.e. 1 in case no aggregation is used, otherwise num_agg is greater than 1.

Figure 3:
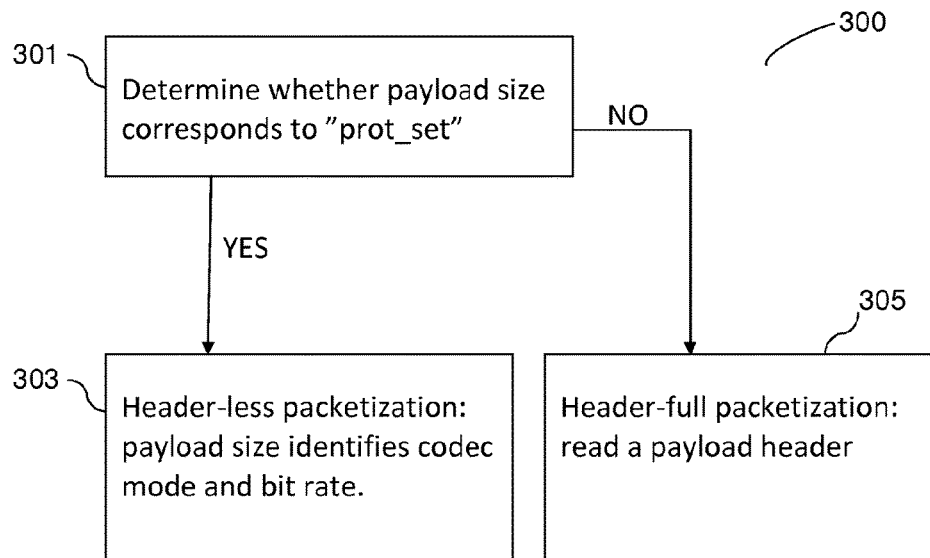
FIG. 3 illustrates an example of a depacketization method performed by a decoder

At the receiving end the depacketization has to perform a reverse algorithm 300 of the above, in order to determine the coded speech/audio data frames in the received packet and the associated signaling information as illustrated in FIG. 3. For instance, the depacketizer may first determine whether the payload size corresponds to any of the members of the set of protected or unique payload sizes, "prot_set", as shown in block 301. In that case header-less packetization was used and the size of the payload identifies in a unique manner the used codec mode and bit rate, as shown in block 303. Otherwise, header-full packetization was used. In that case, the depacketizer first reads the RTP payload header (or at least a first RTP payload header), as shown in block 305. The payload header contains all necessary signaling information about the rate and codec mode used for encoding the speech/audio payload and if for instance frame aggregation was used, which may imply that further header information associated with further encoded speech/audio frames may exist. It should be noted that there may be one RTP header for each speech/audio frame, or there may be just a single RTP header even in case frame aggregation is used. Potential additional signaling information that may also be part of the RTP header may also be extracted by the depacketizing method of the receiver.

In a further step of the method data associated with the codec mode to be used for interoperating with legacy equipment is treated such that it can be transmitted together with the payload associated with that codec mode and by using the efficient header-less packetization. It should be noted that this signaling information may be necessary for interoperation with a legacy equipment. While in principle it may appear impossible to transmit such extra information in case of header-less packetization, there is still such a possibility in case there are unused bits in the speech/audio payload. This will be described in detail in the following embodiments.

One of such embodiments is explained with the concrete example of the AMR-WB interoperable mode to be used for interoperating with legacy equipment. As can be seen from the Table 4 below, depending on the used mode the bits to be transmitted per frame are generally not integer multiples of 8, which is the case in RTP packetization. Hence, when packing these payload bits in octets (or bytes) of 8 bits, some bits of the byte-packed payload remain unused. In the table below, these unused bits are denoted as 'spare bits'. As can be seen, there is always a minimum of 3 spare bits available.

TABLE 4

Number of spare bits in RTP packetization of AMR-WB codec payload data

| # | mode | Bits per frame | Bytes (octets) | spare bits |
|---|------|----------------|----------------|------------|
| 0 | 6.6 | 132 | 17 | 4 |
| 1 | 8.85 | 177 | 23 | 7 |
| 2 | 12.65 | 253 | 32 | 3 |
| 3 | 14.25 | 285 | 36 | 3 |
| 4 | 15.85 | 317 | 40 | 3 |
| 5 | 18.25 | 365 | 46 | 3 |
| 6 | 19.85 | 397 | 50 | 3 |
| 7 | 23.05 | 461 | 58 | 3 |
| 8 | 23.85 | 477 | 60 | 3 |
| 9 | SID | 40 | 6 | 8 |

The first case to consider is that the amount of extra signaling information does not exceed the available spare bits. Then, the method can directly use the spare bits for the transmission of the extra information. As an example the case is assumed that the speech/audio payload corresponds to AMR-WB mode #2 (i.e. 12.65) of the above table. And further it is assumed that the extra information to be transmitted comprises 3 bits. Then, the data bits of that mode are the bits d(0) through d(252). As shown in the FIG. 4, they can be placed into the header-less RTP packet starting from bit 0 of octet 0. The 3 extra signaling bits S are then placed after the last data data bit d(252).

It should be noted here that the above scheme is only one specific example. In particular, it can be useful to place the AMR-WB data bits into the RTP packet with a displacement, in case for instance, the packets will be repacketized in a media gateway using another RTP payload format, e.g. RFC 4867 with bandwidth efficient packaging. Such an example is shown in alternative scheme in FIG. 5. Due to the displacement, the first data bit of the AMR-WB payload is not d(0) but for instance d(2). The bits d(0) and d(1) are then inserted at the end of the AMR-WB payload bits.

The more general case is however that there are more signaling bits that can be carried with the spare bit. In that case, a first preferred embodiment is to spread the transmission of the signaling information in time. To that end, the extra signaling information is first decimated in time. Assume that this extra signaling information arrives with the same frequency as the coded speech/audio frames, it must first be ensured that this data is sufficiently decimated (or sub-sampled) that the rate required to transmit it does not exceed the available transmission rate that can be accomplished by using the spare bits. It is to be noted that in many cases such signaling information can be decimated without significant impact on the service. In a more concrete embodiment, it can be assumed that this data are CMRs to be used for codec mode adaptation. This type of data can be decimated without severe impact.

In an even more concrete example of this embodiment, it is assumed that there are 4 CMR bits that need to be signaled each 20 ms. First, this data is decimated such that there are only 4 CMR bits each 40 ms, i.e. every other frame. Then these decimated 4 CMR bits are split into 2 two-bit parts and transmitted in adjacent frames: A first two-bit part is transmitted with a first frame, the remaining two-bit part follows with a second frame. Whether the two least significant bits or the two most significant two-bit parts are transmitted is indicated with an LSB bit.

This is illustrated in even more detail as follows: The 4 CMR bits are called ($c_3$, $c_2$, $c_1$, $c_0$), then the tuple ($c_3$, $c_2$) are the two most significant bits, the tuple ($c_1$, $c_0$) are the two least significant bits. In a first frame the three S bits of FIG. 5 or 6 may carry the bits ($c_1$, $c_0$, L), where L=1 indicates that $c_1$ and $c_0$ are LSBs. In a corresponding second frame the three S bits carry the bits ($c_3$, $c_2$, L), where L=0 indicates that $c_3$ and $c_2$ are LSBs.

In another embodiment, the signaling information is reduced to an amount that can be transported using the available spare bits through remapping to the available spare bits. Consider again the example that 4 CMR bits need to be reduced to 3 available spare bits. Since the CMR bits encode requests for one of the AMR-WB modes shown above, one possibility is that CMRs for 8 of the 9 AMR-WB modes (all modes except 23.05) are signalled with the three spare bits. CMRs for mode 23.05 are remapped to a neighbouring mode (19.85). Another example is that only CMRs corresponding to modes 6.6, 8.85, 12.65, 15.85 and 23.85 are allowed and any CMR for a different AMR-WB mode is remapped to the nearest allowed AMR-WB mode. Note in that context that these 5 AMR-WB modes are the relevant AMR-WB modes to be used in circuit switched (CS) 3GPP voice services. In these two examples it is now possible to use the three available S bits directly to transmit the remapped signalling information.

A further embodiment may work similarly to the embodiment above with the remapping but only for the CMRs for the subset of modes that are allowed to be signalled directly using the S bits. Should there be a CMR for another mode, header-full instead of header-less packetizing could be chosen. In the RTP payload header used in that case, there could be sufficient signalling space in order to convey the CMRs for this other mode.

The following embodiment according to Table 5 shows an example of an RTP payload header that could be used for header-full packetization. According to this embodiment an 8 bit header is defined with the following signal elements:
FT (5 bits): frame type
used for signaling of non-interoperable and AMR-WB interoperable modes F (1 bit): continuation
If set to 1, indicates that this frame is followed by another speech frame in this payload; if set to 0, indicates that this frame is the last frame in this payload.
CMR_ext/Spare (1 bit): extra CMR bit
May be used as part of the embodiments where CMRs for AMR-WB interoperable modes that are not allowed to be signaled by the spare bits. This additional CMR_ext bit allows to increase the CMR signaling space to 4 bits, which is then wide enough to signal CMRs for all AMR-WB modes. Otherwise it could be spare/unused. This bit could be used for instance for extending the signaling space further for non-interoperable modes.
Spare (1 bit)
Currently unused. Could be used to extend the signalling space to allow for further modes/rates, like e.g. stereo.

TABLE 5 an example of an RTP payload header for header-full packetization

| Payload header | FT | F | CMR_ext | spare |
|---|---|---|---|---|
| Number of bits | 5 | 1 | 1 | 1 |

Figure 6:
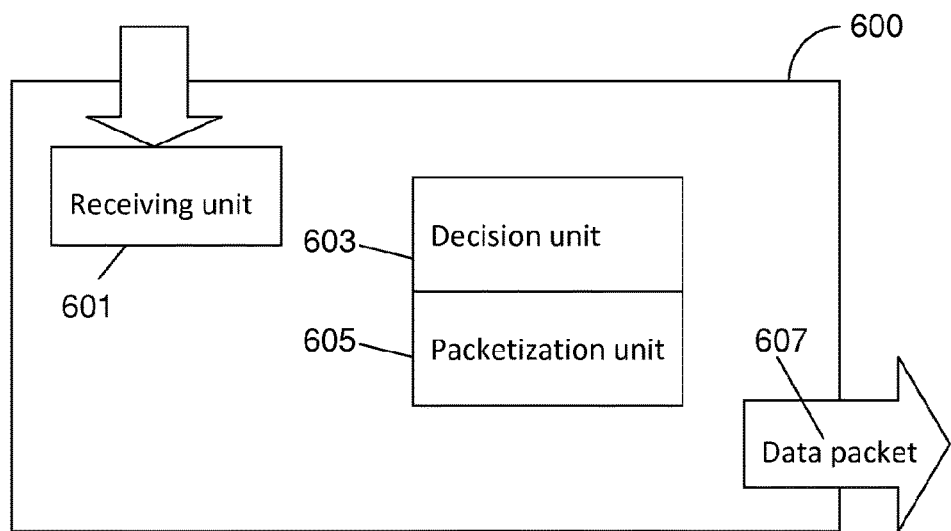
FIG. 6 shows a first example of an apparatus according to an embodiment of the invention.

The embodiments apply to a codec for a speech/audio signal. FIG. 6 is a schematic block diagram of an apparatus according to the embodiments. This figure illustrates part of an encoder side of the codec. The apparatus 600 comprises an input unit (receiving unit) 601 configured to receive speech/audio payload data, and a unit for packetizing 605 the speech/audio payload for transmission as a bit stream. The apparatus further comprises a unit for deciding 603 whether or not payload header is used. FIG. 6 illustrates only units that are necessary to understand the embodiments of the invention. Since the apparatus 600 may be implemented as a part of an encoder, there may be several other units performing encoding of the speech/audio signal that are not shown in the figure. Further, the receiving unit 601 may be seen as a unit for receiving an encoded speech/audio signal for packetization, or it can be seen as a unit for receiving a speech/audio signal, in which case there may be one or more units between the receiving unit 601 and the decision unit 603.

Figure 7:
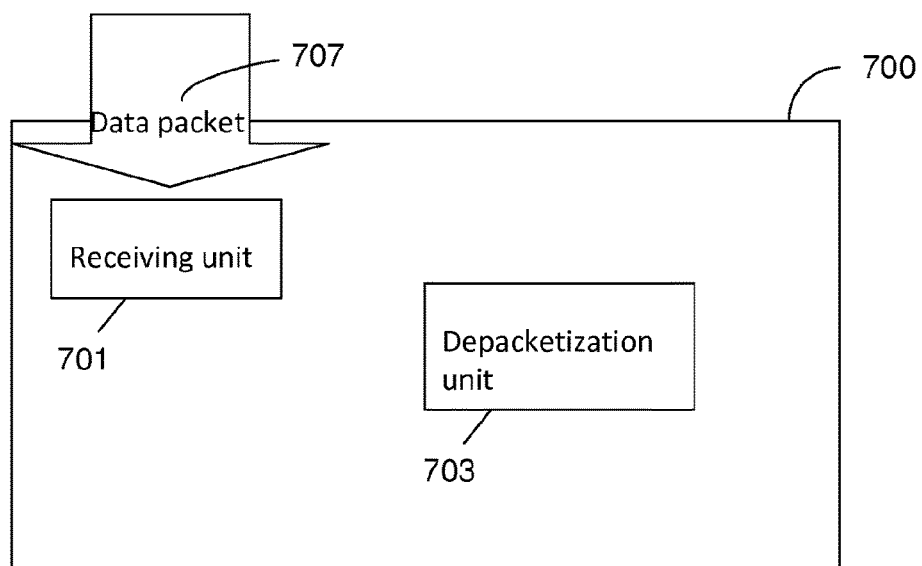
FIG. 7 shows a second example of an apparatus according to an embodiment of the invention.

FIG. 7 is a schematic block diagram of another example apparatus according to the embodiments. This figure illustrates part of a decoder side of the codec. The apparatus 700 comprises an input unit (receiving unit) 701 configured to receive data packets 707 comprising an encoded speech/audio signal, and a unit for depacketizing 703 the received data packets 707 for decoding the encoded speech/audio signal. FIG. 7 illustrates only units that are necessary to understand the embodiments of the invention. Since the apparatus 700 may be implemented as a part of a decoder, there may be several other units performing decoding of the encoded speech/audio signal that are not shown in the FIG. 7.

The codec with its included units could be implemented in hardware. There are numerous variants of circuitry elements that can be used and combined to achieve the functions of the units of the codec. Such variants are encompassed by the embodiments. Particular examples of hardware implementation of the codec is implementation in digital signal processor (DSP) hardware and integrated circuit technology, including both general-purpose electronic circuitry and application-specific circuitry.

Figure 8:
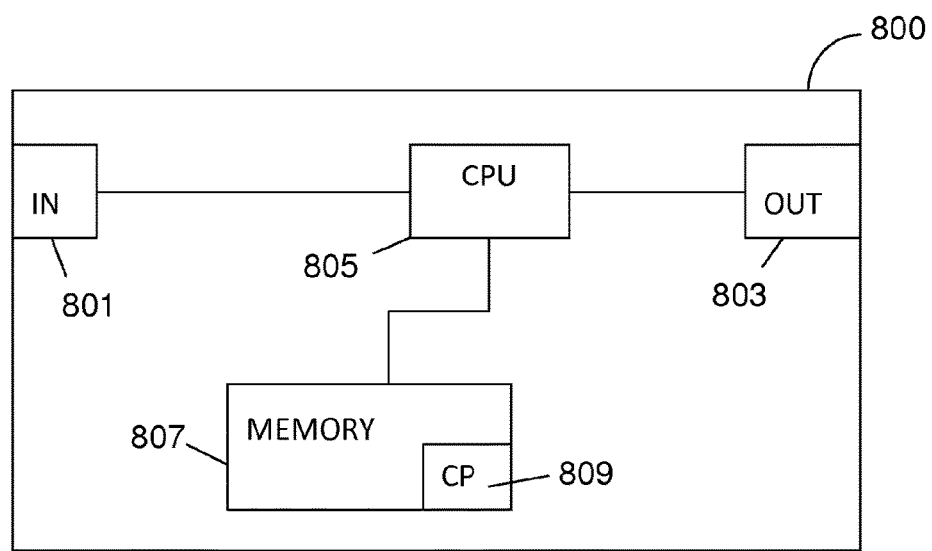
FIG. 8 shows a third example of an apparatus according to an embodiment of the invention.

FIG. 8 shows another example of an apparatus according to the embodiments. The apparatus 800 comprises an input node 801 for receiving a speech/audio signal (when the apparatus is an encoder) or a bit stream corresponding to an encoded speech/audio signal (when the apparatus is a decoder), and an output node 803 for providing a bit stream for transmission (encoder) or for providing a decoded speech/audio signal (decoder). The apparatus 800 further comprises a processor 805, e.g. a central processing unit (CPU), and a computer program product in the form of a memory 807 for storing the instructions, e.g. computer program 809 that, when retrieved from the memory 807 and executed by the processor 805 causes the apparatus 800 to perform processes connected with embodiments of the present invention, for example at least one of the methods illustrated in FIGS. 1, 2 and 3. The processor 805 is communicatively coupled to the input node 801, to the output node 803 and to the memory 807.

The technology described above may be used e.g. in a speech/audio codec, which can be used in a mobile device (e.g. mobile phone, laptop) or a stationary device, such as a personal computer.

It is to be understood that the choice of interacting units or modules, as well as the naming of the units are only for exemplary purpose, and may be configured in a plurality of alternative ways in order to be able to execute the disclosed process actions.

It should also be noted that the units or modules described in this disclosure are to be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for formatting a payload for transmission of multi-mode speech codec data or multi-mode audio codec data, the method comprising:
deciding whether a header-less or a header-full payload format is used, wherein the deciding comprises determining whether frame aggregation with multiple coded frames per packets is used; and
packetizing the payload with or without a payload header depending on the decision, wherein
it is decided to use the header-full format as a result of determining that frame aggregation with multiple coded frames per packets is used, and
the header-less payload format is associated with a predefined set of payload sizes,
each payload size included in said predefined set identifies a unique bitrate.

2. The method of claim 1, wherein each payload size included in said predefined set of payload sizes indicates a codec mode.

3. The method of claim 1, wherein the payload data carries a single coded frame when the header-less payload format is used.

4. The method of claim 1, wherein
the deciding further comprises determining a required functionality, the required functionality comprises at least one of:
an inclusion of an RTP payload header;
an inclusion of mode adaptation data; and
an inclusion of codec specific signaling data.

5. The method of claim 4, wherein it is decided to use the header-full format when codec specific signaling data is included.

6. The method of claim 5, wherein codec specific signaling data comprises audio bandwidth information or codec internal mode information.

7. The method of claim 4, wherein it is decided to use the header-full format when information bits related to codec mode adaptation are included.

8. The method of claim 1, wherein the deciding further comprises determining a required functionality, and the required functionality comprises transmission of extra signaling information associated with the codec mode to be used for interoperating with legacy equipment.

9. The method of claim 8, wherein said extra signaling information is related to codec mode adaptation and comprises codec mode request (CMR) bits, wherein a subset of modes are allowed to be requested using unused bits in the payload data when using the header-less payload format, and CMRs for modes not belonging to said subset of modes are transmitted using the header-full payload format.

10. The of claim 1, wherein when it is decided to use the header-full payload format, a packet size is adjusted by adding padding bytes such that it does not coincide with any of the predefined payload sizes.

11. A method for depacketizing a received packet of coded speech data frames or coded audio data frames, the method comprising:
    determining whether a payload size of the received packet corresponds to any of members of a set of predefined payload sizes, and
    reading a payload header if it is determined that the payload size of the received packet does not correspond to any of the members of the set of predefined payload sizes.

12. The method of claim 11, further comprising extracting information from the payload header for determining a codec mode and a bit rate, when it is determined that the payload size of the received packet does not correspond to any of the members of the set of predefined payload sizes.

13. The method of claim 11, further comprising determining a codec mode and a bit rate based on the payload size, when it is determined that the payload size of the received packet corresponds to one of the members of the set of predefined payload sizes.

14. An apparatus comprising:
    a processor, and a memory storing instructions that, when executed by the processor, cause the apparatus to:
    decide whether a header-less or a header-full payload format is used, wherein the apparatus is configured to decide whether a header-less or a header-full payload format is used by performing a deciding process comprising determining whether frame aggregation with multiple coded frames per packets is used; and
    packetize the payload with or without a payload header depending on the decision, wherein
    the apparatus is configured to decide to use the header-full format as a result of determining that frame aggregation with multiple coded frames per packets is used,
    the header-less payload format is associated with a predefined set of payload sizes, and
    each payload size included in said predefined set identifies a unique bitrate.

15. The apparatus of claim 14, wherein each payload size included in said predefined set of payload sizes indicates a codec mode.

16. The apparatus of claim 14, wherein the deciding process further comprises determining a required functionality, the required functionality comprises at least one of:
    an inclusion of an RTP payload header;
    an inclusion of mode adaptation data; and
    an inclusion of codec specific signaling data.

17. The apparatus of claim 16, wherein the apparatus is configured to decide to use the header-full format as a result of determining that inclusion of codec specific signaling data is a required functionality.

18. The apparatus of claim 16, wherein codec specific signaling data comprises audio bandwidth information or codec internal mode information.

19. The apparatus of claim 16, wherein the apparatus is configured to decide to use the header-full format as a result of determining that inclusion of mode adaptation data is a required functionality.

20. The apparatus of claim 14, wherein the deciding process further comprises determining a required functionality, the required functionality comprises transmission of extra signaling information associated with the codec mode to be used for interoperating with legacy equipment.

21. The apparatus of claim 20, wherein said extra signaling information is related to codec mode adaptation and comprises codec mode request (CMR) bits, wherein a subset of modes are allowed to be requested using unused bits in the payload data when using the header-less payload format, and CMRs for modes not belonging to said subset of modes are transmitted using the header-full payload format.

22. The apparatus of claim 14, further comprising adjusting a packet size by adding padding bytes such that it does not coincide with any of the predefined payload sizes when it is decided to use the header-full payload format.

23. The apparatus of claim 14, wherein the apparatus is comprised in or communicatively coupled to a speech or audio codec having at least two operating modes of which at least one is an interoperability mode interoperable with a legacy codec.

24. An apparatus comprising:
    a processor, and a memory storing instructions that, when executed by the processor, cause the apparatus to:
    receive a data packet comprising an encoded speech signal or an encoded audio signal;
    determine whether a payload size of the received packet corresponds to any of members of a set of predefined payload sizes, and
    read a payload header if it is determined that the payload size of the received packet does not correspond to any of the members of the set of predefined payload sizes.

25. The apparatus of claim 24, further comprising
    extracting information from the payload header for determining a codec mode and a bit rate, if it is determined that the payload size of the received packet does not correspond to any of the members of the set of predefined payload sizes, and
    determining a codec mode and a bit rate based on the payload size, if it is determined that the payload size of the received packet corresponds to one of the members of the set of predefined payload sizes.

26. A computer program product comprising a non-transitory computer readable medium storing computer readable code units which when run on an apparatus causes the apparatus to:
    decide whether a header-less or a header-full payload format is used, wherein the apparatus is configured to decide whether a header-less or a header-full payload format is used by performing a deciding process comprising determining whether frame aggregation with multiple coded frames per packets is used; and
    packetize the payload with or without a payload header depending on the decision, wherein
    the apparatus is configured to decide to use the header-full format as a result of determining that frame aggregation with multiple coded frames per packets is used,
    the header-less payload format is associated with a predefined set of payload sizes, and each payload size included in said predefined set identifies a unique bitrate.

27. A computer program product comprising a non-transitory computer readable medium storing computer readable code units which when run on an apparatus causes the apparatus to:
- receive a data packet comprising an encoded speech signal or an encoded audio signal;
- determine whether a payload size of the received packet corresponds to any of members of a set of predefined payload sizes, and
- read a payload header if it is determined that the payload size of the received packet does not correspond to any of the members of the set of predefined payload sizes.

28. The apparatus according to claim 14, wherein the apparatus is comprised in a mobile device.

* * * * *